US012747828B2

(12) United States Patent
Kosugi et al.

(10) Patent No.: US 12,747,828 B2
(45) Date of Patent: Sep. 29, 2026

(54) METHOD FOR CONTROLLING SUPPLY OF LUBRICANT, DEVICE FOR CONTROLLING SUPPLY OF LUBRICANT, AND PROGRAM

(71) Applicant: NSK LTD., Tokyo (JP)

(72) Inventors: Daichi Kosugi, Kanagawa (JP); Yamato Fukui, Kanagawa (JP); Tomoyuki Matsuda, Kanagawa (JP); Taisuke Maruyama, Kanagawa (JP); Yasuyuki Shimizu, Kanagawa (JP)

(73) Assignee: NSK LTD., Tokyo (JP)

( * ) Notice: Subject to any disclaimer, the term of this patent is extended or adjusted under 35 U.S.C. 154(b) by 19 days.

(21) Appl. No.: 18/879,932

(22) PCT Filed: Jul. 6, 2023

(86) PCT No.: PCT/JP2023/025172
§ 371 (c)(1),
(2) Date: Dec. 30, 2024

(87) PCT Pub. No.: WO2024/010071
PCT Pub. Date: Jan. 11, 2024

(65) Prior Publication Data
US 2025/0389383 A1 Dec. 25, 2025

(30) Foreign Application Priority Data
Jul. 6, 2022 (JP) ................................ 2022-109201

(51) Int. Cl.
*F16N 29/02* (2006.01)
*F16C 33/66* (2006.01)

(52) U.S. Cl.
CPC ............. *F16N 29/02* (2013.01); *F16C 33/66* (2013.01); *F16C 2233/00* (2013.01)

(58) Field of Classification Search
CPC ... F16C 33/66; F16C 2233/00; F16C 33/6625
See application file for complete search history.

(56) References Cited

U.S. PATENT DOCUMENTS 7,552,799 B2 * 6/2009 Sherrington ............ F16N 29/02 324/699
2003/0047386 A1 * 3/2003 Sherrington ............ F16N 29/02 184/7.4
(Continued)

FOREIGN PATENT DOCUMENTS

JP 2-11206 A 1/1990
JP 2004-76938 A 3/2004
(Continued)

OTHER PUBLICATIONS

International Search Report (PCT/ISA/210) issued on Sep. 12, 2023 by the International Searching Authority in International Application No. PCT/JP2023/025172.
(Continued)

*Primary Examiner* — Robert W Hodge
*Assistant Examiner* — Mark K Buse
(74) *Attorney, Agent, or Firm* — Sughrue Mion, PLLC

(57) ABSTRACT

A lubricant supply control method for a device that lubricates a plurality of portions using a lubricant includes: measuring an impedance of an electric circuit including the plurality of portions by applying an AC voltage to the electric circuit; deriving an oil film thickness and a breakage rate of an oil film between the plurality of portions based on the measured impedance; and controlling at least one of a supply amount and a supply timing of the lubricant to the device based on the derived oil film thickness and breakage rate of the oil film so that a lubrication state between the plurality of portions becomes a predetermined lubrication state.

3 Claims, 3 Drawing Sheets

(56) References Cited

U.S. PATENT DOCUMENTS

| | | | | |
|---|---|---|---|---|
| 2006/0165328 | A1* | 7/2006 | Ueno | F04B 53/18 384/462 |
| 2006/0239598 | A1 | 10/2006 | Matsuyama et al. | |
| 2009/0152050 | A1* | 6/2009 | Hattori | F16C 33/6674 184/6.4 |
| 2016/0025138 | A1* | 1/2016 | Watanabe | F16C 33/6659 184/6.1 |
| 2017/0350450 | A1* | 12/2017 | Watanabe | F16C 33/6677 |
| 2023/0366781 | A1 | 11/2023 | Maruyama et al. | |
| 2025/0389383 | A1* | 12/2025 | Kosugi | F16N 29/02 |

FOREIGN PATENT DOCUMENTS

| | | | |
|---|---|---|---|
| JP | 2004-316707 | A | 11/2004 |
| JP | 2007-132317 | A | 5/2007 |
| JP | 2008-304037 | A | 12/2008 |
| JP | 2016-23759 | A | 2/2016 |
| JP | 2017-219099 | A | 12/2017 |
| JP | 2019-211317 | A | 12/2019 |
| JP | 2020-193968 | A | 12/2020 |
| JP | WO2022054352 | * | 3/2022 |
| WO | 2022/054352 | A1 | 3/2022 |

OTHER PUBLICATIONS

Written Opinion (PCT/ISA/237) issued on Sep. 12, 2023 by the International Searching Authority in International Application No. PCT/JP2023/025172.

Extended European Search Report issued Jun. 9, 2026 by the European Patent Office for EP Patent Application No. 23835602.6.

* cited by examiner

METHOD FOR CONTROLLING SUPPLY OF LUBRICANT, DEVICE FOR CONTROLLING SUPPLY OF LUBRICANT, AND PROGRAM

CROSS-REFERENCE TO RELATED APPLICATIONS

This application is a National Phase Entry of PCT International Application No. PCT/JP2023/025172 filed on Jul. 6, 2023, which claims priority to Japanese Patent Application No. 2022-109201 filed on Jul. 6, 2022, the contents of all of which are incorporated herein by reference in their entirety.

TECHNICAL FIELD

The present invention relates to a lubricant supply control method, a lubricant supply control device, and a program.

BACKGROUND ART

In the related art, in a bearing device, a configuration for lubricating rotation of the bearing device by using a lubricant (for example, a lubricating oil or a grease) is widely used. The lubricant is gradually consumed and deteriorates as the bearing device operates, and thus the lubricant is appropriately supplied in order to stably drive the bearing device and prevent damage to the bearing device.

A supply timing and a supply amount of the lubricant are affected by a state of the bearing device at a certain time point. For example, Patent Literature 1 discloses a configuration in which a timing at which a grease is supplemented to a bearing based on an integrated value of a rotation speed of a shaft and a time is controlled. Patent Literature 2 discloses a configuration using a DC power supply device in a method of monitoring a state of an oil film in a bearing device.

CITATION LIST

Patent Literature

Patent Literature 1: JP2004-76938A
Patent Literature 2: JP2008-304037A

SUMMARY OF INVENTION

Technical Problem

For example, according to the technique of Patent Literature 1, since the state of the oil film is not directly measured, the amount of the supplied lubricant may be excessive or insufficient. Therefore, in order to achieve more stable operation of the bearing device, a control method related to the supply of the lubricant with higher accuracy is required. In addition, when the lubricant is excessively supplied, a torque related to the operation of the bearing device increases, which hinders reduction in torque of the device. Further, as a result of supplying the lubricant more than necessary, wasteful consumption of the lubricant occurs.

In view of the above problems, an object of the present invention is to provide a lubricant supply control method that is capable of achieving reduction in torque and restraining wasteful consumption of a lubricant in a device using the lubricant.

Solution to Problem

In order to solve the above problems, the present invention has the following configuration. That is, a lubricant supply control method for a device that lubricates a plurality of portions using a lubricant, includes:

- a measurement step of measuring an impedance of an electric circuit including the plurality of portions by applying an AC voltage to the electric circuit;
- a derivation step of deriving an oil film thickness and a breakage rate of an oil film between the plurality of portions based on the impedance measured in the measurement step; and
- a control step of controlling at least one of a supply amount and a supply timing of the lubricant to the device based on the oil film thickness and the breakage rate of the oil film derived in the derivation step so that a lubrication state between the plurality of portions becomes a predetermined lubrication state.

Further, another aspect of the present invention has the following configuration. That is, a lubricant supply control device for a device that lubricates a plurality of portions using a lubricant, includes:

- a measurement unit configured to measure an impedance of an electric circuit including the plurality of portions by applying an AC voltage to the electric circuit;
- a derivation unit configured to derive an oil film thickness and a breakage rate of an oil film between the plurality of portions based on the impedance measured by the measurement unit; and
- a control unit configured to control at least one of a supply amount and a supply timing of the lubricant to the device based on the oil film thickness and the breakage rate of the oil film derived by the derivation unit so that a lubrication state between the plurality of portions becomes a predetermined lubrication state.

Further, another aspect of the present invention has the following configuration. That is, a program causes a computer to execute:

- a measurement step of measuring an impedance of an electric circuit including a plurality of portions, which are lubricated by using a lubricant in a device, by applying an AC voltage to the electric circuit;
- a derivation step of deriving an oil film thickness and a breakage rate of an oil film between the plurality of portions based on the impedance measured in the measurement step; and
- a control step of controlling at least one of a supply amount and a supply timing of the lubricant to the device based on the oil film thickness and the breakage rate of the oil film derived in the derivation step so that a lubrication state between the plurality of portions becomes a predetermined lubrication state.

Advantageous Effects of Invention

According to the present invention, it is possible to provide a lubricant that is capable of achieving reduction in torque and restraining wasteful consumption of a lubricant in a device using the lubricant.

DESCRIPTION OF EMBODIMENTS

Figure 1:
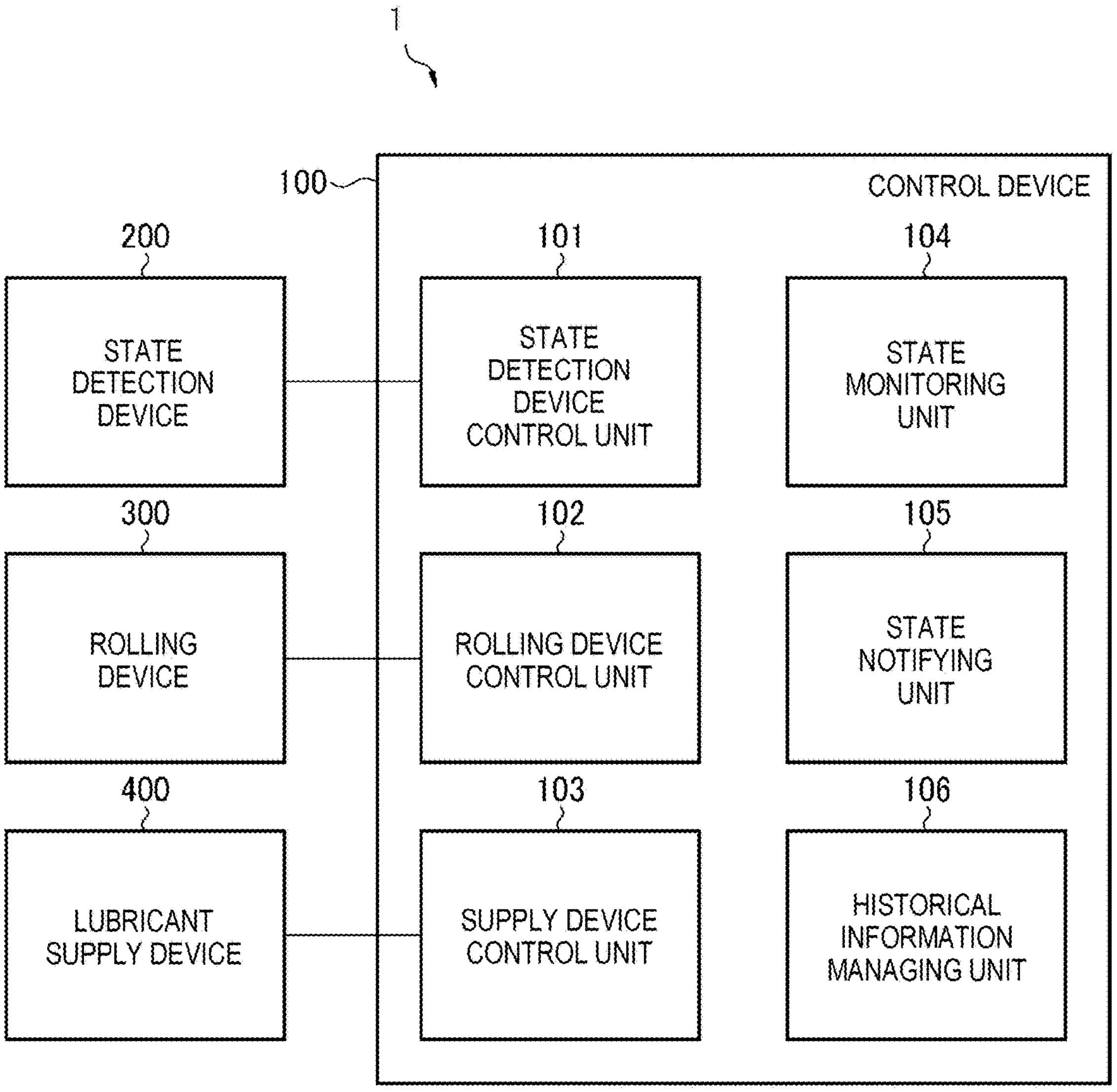
FIG. 1 is a schematic diagram showing an example of a device configuration according to an embodiment of the present invention.

Hereinafter, embodiments of the present invention will be described with reference to the drawings. The embodiments described below are embodiments for explaining the present invention, and are not intended to be interpreted to limit the present invention, and all the configurations described in the embodiments are not necessarily essential configurations for solving the problem of the present invention. In the drawings, the same components are denoted by the same reference numerals, thereby showing a correspondence relation therebetween.

First Embodiment

Hereinafter, a first embodiment of the present invention will be described. In the following description, a ball bearing is described as an example of a rolling bearing included in a bearing device, but the present invention is not limited thereto. The present invention can also be applied to a device that is a device capable of using a lubricant and has another configuration in which the lubricant can be supplied from the outside as appropriate. Examples of a type of the rolling bearing to which the present invention may be applied include a deep groove ball bearing, an angular contact ball bearing, a tapered roller bearing, a cylindrical roller bearing, and a self-aligning roller bearing. Further, the present invention can also be applied to other rolling devices such as a spindle.

Device Configuration

FIG. 1 is a schematic configuration diagram showing an example of an overall configuration of a system 1 in which a lubricant supply control according to the present embodiment can be executed. The system 1 includes a control device 100, a state detection device 200, a rolling device 300, and a lubricant supply device 400. The control device 100 controls the state detection device 200, the rolling device 300, and the lubricant supply device 400, and acquires various types of information from these devices.

The state detection device 200 monitors a state of the rolling device 300 based on an instruction from the control device 100, and detects a state change thereof and the like. In the present embodiment, the state detection device 200 detects a thickness of an oil film of a lubricant in the rolling device 300, the presence or absence of breakage of the oil film, and the like according to an electrical technique (more specifically, the electrical impedance method (EIM)). Further, the state detection device 200 may include a temperature sensor that detects the temperature of the rolling device 300, and other sensors.

The rolling device 300 includes, for example, a rolling bearing (not shown) such as a ball bearing, and performs a rotational motion based on an instruction from the control device 100. The lubricant supply device 400 supplies the lubricant to a predetermined portion of the rolling device 300 based on an instruction from the control device 100. The lubricant supply device 400 may include, for example, a syringe pump.

The control device 100 includes a state detection device control unit 101, a rolling device control unit 102, a supply device control unit 103, a state monitoring unit 104, a state notifying unit 105, and a historical information managing unit 106. The state detection device control unit 101 causes the state detection device 200 to monitor the state of the rolling device 300 and acquire a detection result. The rolling device control unit 102 controls an operation of the rolling device 300 by, for example, driving a motor (not shown) to rotate or stop a rotation shaft (not shown) of the rolling device 300. The supply device control unit 103 causes the lubricant supply device 400 to supply the lubricant according to a state of the lubricant in the rolling device 300.

The state monitoring unit 104 monitors the state of the rolling device 300 according to various detection results acquired via the state detection device control unit 101. The state notifying unit 105 notifies a user of a result monitored by the state monitoring unit 104, control results of the respective devices, and the like. A notification method here is not particularly limited, and the above may be displayed on a screen via a display unit, or may be notified by voice or the like. The historical information managing unit 106 records and manages the result monitored by the state monitoring unit 104, the control results of the respective devices, and the like as historical information.

The control device 100 may be implemented by, for example, an information processing device including a control unit, a storage unit, and an output unit, which are not shown. The control unit may include a central processing unit (CPU), a micro processing unit (MPU), a digital single processor (DSP), and a dedicated circuit. The storage unit includes volatile and nonvolatile storage media such as a hard disk drive (HDD), a read only memory (ROM), and a random access memory (RAM), and may input and output various kinds of information in response to an instruction from the control unit. The output unit includes a speaker, a light, or a display device such as a liquid crystal display, and performs output to an operator in response to an instruction from the control unit. The output unit may be a network interface having a communication function, and may perform an output operation by transmitting data to an external device (not shown) via a network (not shown).

In the present embodiment, an example is described in which the control device 100 is configured as one device that controls the state detection device 200, the rolling device 300, and the lubricant supply device 400, but the present invention is not limited thereto. A configuration may be adopted in which separate control devices may be provided for the state detection device 200, the rolling device 300, and the lubricant supply device 400, and the separate control devices coordinate with each other.

In the rolling device 300, the rolling bearing rotatably supports the rotation shaft. The rotation shaft is supported by a housing that covers the outside of the rotation shaft via the rolling bearing as a rotating component. The rolling bearing includes an outer ring (an outer member) which is a fixed ring internally fitted to the housing, an inner ring (an inner member) which is a rotating ring externally fitted to the rotation shaft, a plurality of balls (rollers) which are a plurality of rolling elements arranged between the inner ring and the outer ring, and a retainer (not shown) that retains the rolling elements such that the rolling elements can roll freely. Here, although the configuration in which the outer ring is fixed is used, a configuration in which the inner ring is fixed and the outer ring rotates may be used. In addition, a seal that is a peripheral member for preventing entry of dust into the periphery of the rolling elements and leakage of a lubricating oil may be provided. In the rolling bearing, friction between the inner ring and the rolling elements and friction between the outer ring and the rolling elements are reduced by a predetermined lubrication method. The lubrication method is not particularly limited, and for example, grease lubrication, oil lubrication, or the like is used and is supplied to the inside of the rolling bearing as appropriate by a process to be described later. A type of the lubricant is also not particularly limited.

In the present embodiment, the rotation shaft of the rolling device 300 is connected to an LCR meter provided in the state detection device 200 via a rotation connector (not shown). The rotation connector may be configured with, for example, a carbon brush, and is not limited thereto. Further, the rolling bearing of the rolling device 300 is also electrically connected to the LCR meter, and at this time, the LCR meter also functions as an AC power supply for the rolling bearing.

At the time of state detection (state monitoring), the state detection device control unit 101 of the control device 100 instructs the LCR meter to use, as inputs, an angular frequency ω of the AC power supply and an AC voltage V, and acquires, as outputs corresponding thereto, an impedance Z and a phase angle θ of the rolling device 300 from the LCR meter. Then, the state monitoring unit 104 of the control device 100 detects information related to the state of the lubricant in the rolling device 300 by using these values. A specific detection method of the state (for example, the thickness of the oil film of the lubricant, the presence or absence of the breakage of the oil film, and the like) of the lubricant used in the configuration according to the present embodiment can use the method described in Japan Patent No. 7099551 assigned to the applicant and the like, but is not particularly limited thereto.

Examples of Lubrication State

Figure 2A:
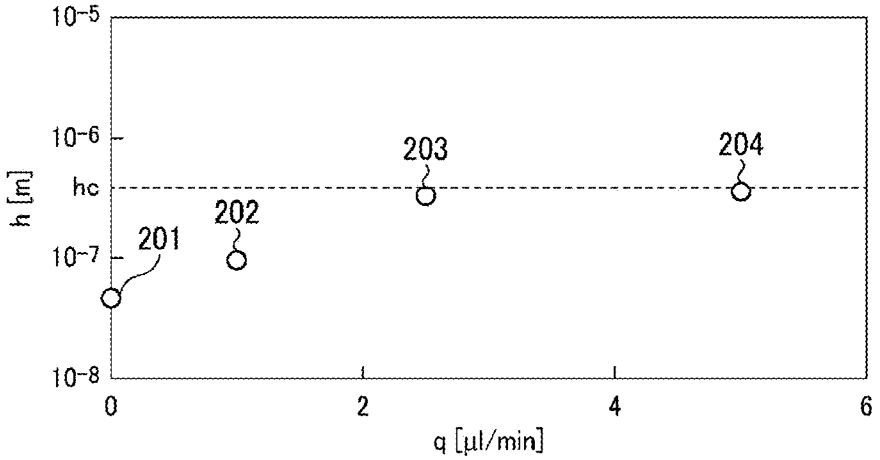
FIGS. 2A to 2C are graphs illustrating measurement results according to the embodiment of the present invention.
Figure 2B:
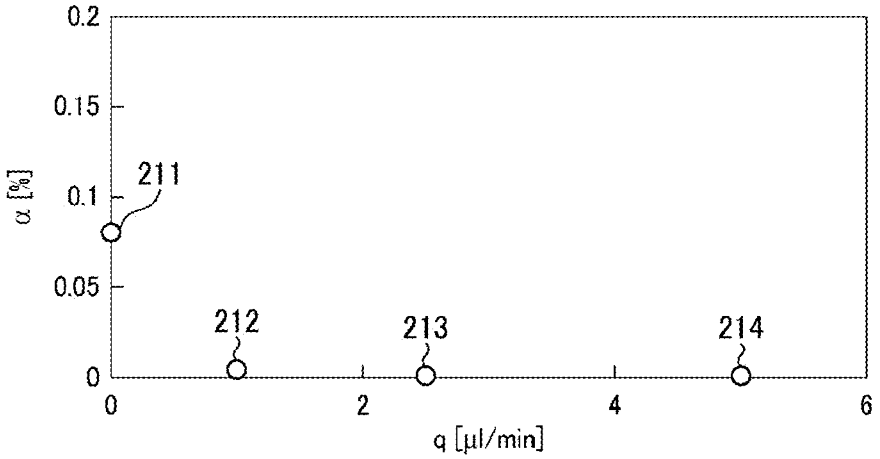
Figure 2C:
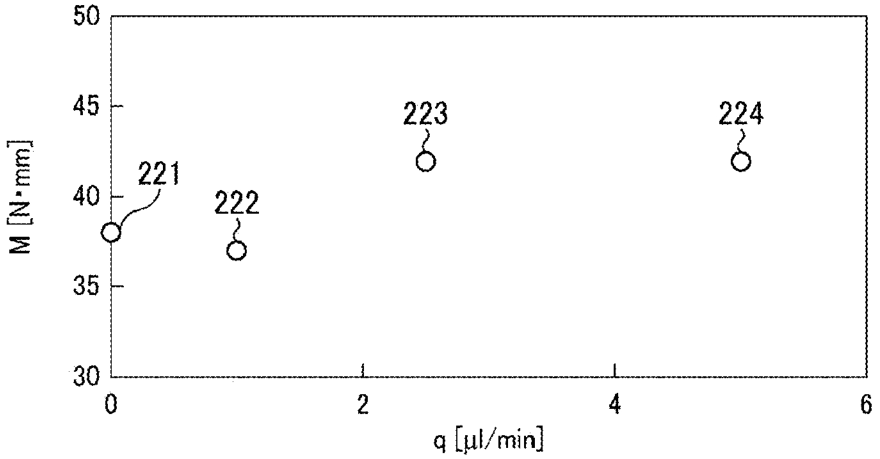

Examples of a lubrication state according to the present embodiment will be described with reference to FIGS. 2A to 2C. FIG. 2A is a graph showing a relation between an oil film thickness h [m] and a supply rate q [μl/min] of the lubricant per unit time. FIG. 2B is a graph showing a relation between a breakage rate α [%] of the oil film and the supply rate q [μl/min] of the lubricant per unit time. FIG. 2C is a graph showing a relation between a torque M [N■mm] for rotating the rotation shaft of the rolling device 300 and the supply rate q [μl/min] of the lubricant per unit time. The supply rate q [μl/min] shown on the horizontal axis in each of FIGS. 2A to 2C corresponds to each other.

Here, the oil film thickness h, the breakage rate α of the oil film, and the like are results acquired based on, for example, the electrical impedance method described in Japanese Patent No. 7099551 in the related art.

FIGS. 2A to 2C will be described in comparison. In FIG. 2A, $h_c$ shown by a dotted line indicates a theoretical oil film thickness, and corresponds to a state in which further lubrication cannot be performed in this state (hereinafter, also referred to as a "first lubrication state"). The theoretical oil film thickness $h_c$ is explained in detail in, for example, Hamrock B J and Dowson D. Isothermal elastohydrodynamic lubrication of point contacts: part III-fully flooded results. ASME Trans J Lubricat Technol 1977; 99:264-275. It is assumed that the lubricant is supplied to the rolling device 300 at a certain timing. The supply rate q shown on the horizontal axis in FIGS. 2A to 2C refers to a supply rate indicating the supply amount of the lubricant per unit time.

When the lubricant is supplied as in points 203 and 204 in FIG. 2A, the oil film thickness h is close to the theoretical oil film thickness $h_c$. In this case, the breakage rate α of the oil film is 0 as shown by points 213 and 214 in FIG. 2B, and contact between components such as the inner ring and the rolling elements is restrained, and the possibility of occurrence of breakage and the like is reduced. On the other hand, the torque M for rotating the rotation shaft of the rolling bearing has a high value as shown by points 223 and 224 in FIG. 2C. In this case, for example, a load on the motor increases, and the efficiency decreases.

On the other hand, when the lubricant is not supplied as shown by a point 201 in FIG. 2A (when the supply rate q is 0), the oil film thickness h decreases, and as a result, the breakage rate α of the oil film increases as shown by a point 211 in FIG. 2B. In this case, the contact between components such as the inner ring and the rolling elements occurs, and the possibility of occurrence of an abnormality such as breakage increases. In this case, the torque M for rotating the rotation shaft may also increase as shown by a point 221 in FIG. 2C due to friction caused by the contact between components or the like.

In view of the above, in the present embodiment, the lubricant supply control is performed by using the supply rate q of the lubricant such that the breakage rate α is 0 or substantially 0 and the oil film thickness h is smaller than the theoretical oil film thickness $h_c$. For example, the lubricant is supplied to achieve a state of the oil film thickness h as shown by a point 202 in FIG. 2A (hereinafter, also referred to as a "second lubrication state"). At this time, as shown in FIG. 2B, the breakage rate α of the oil film is substantially 0. As shown by a point 222 in FIG. 2C, the torque M is also a value smaller than values at the points 223 and 224 corresponding to the theoretical oil film thickness $h_c$, and is further a value smaller than a value at the point 221 at which the contact between components occurs.

Here, a case in which the supply rate per unit time is adjusted has been described as an example, and the same control can be performed even in a case in which a supply frequency for a constant supply amount is adjusted.

[Processing Flow]

Figure 3:
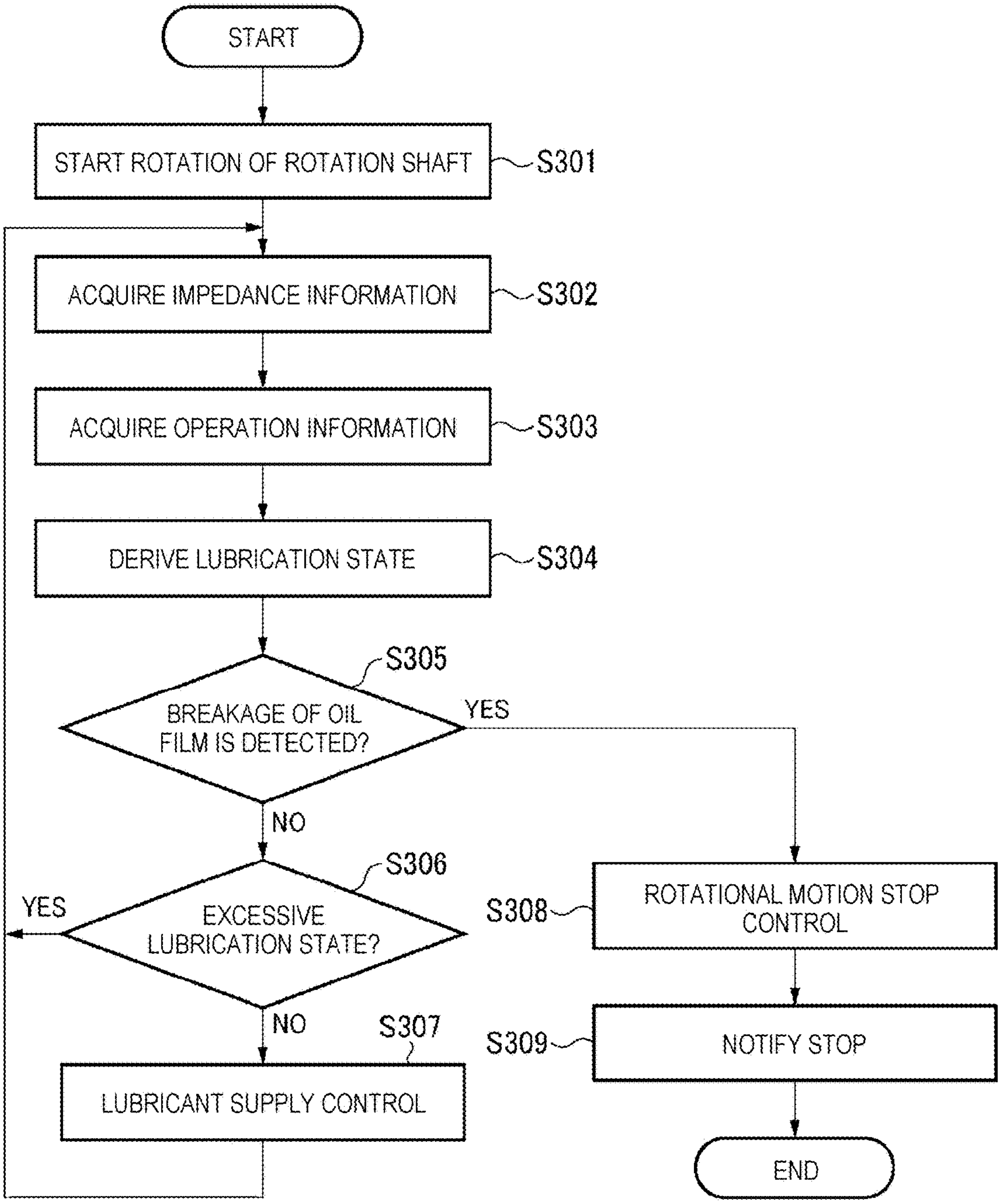
FIG. 3 is a flowchart of a lubricant supply control according to the embodiment of the present invention.

FIG. 3 is a flowchart of the lubricant supply control according to the present embodiment. The process is executed by the control device 100, and may be implemented by, for example, reading out a program for implementing the process according to the present embodiment from the storage unit (not shown) and executing the program by a control unit (not shown) included in the control device 100. In this processing flow, the respective portions of the control device 100 shown in FIG. 1 perform the process in cooperation, and here, for simplicity of description, the control device 100 is collectively described as a processing entity.

In S301, the control device 100 causes the rolling device 300 to start rotation. At this time, the control device 100 may control such that a constant load (for example, an axial load) is applied. The control of applying the load may be performed by a device other than the control device 100.

In S302, the control device 100 causes the state detection device 200 to monitor the state of the rolling device 300 and acquire the detection result. As described above, the AC voltage V of the angular frequency ω is applied to the rolling device 300 by using the AC power supply of the LCR meter, and impedance information (the complex impedance Z, the phase angle θ, and the like) is acquired as a result.

In S303, the control device 100 acquires operation information on the rolling device 300 at that time point. The operation information may include, for example, the load applied to the rolling device 300, the rotation speed, various parameters of the rolling bearing constituting the rolling device 300, the temperature acquired by the temperature sensor, the type and characteristics of the lubricant, and the like.

In S304, the control device 100 derives the lubrication state (the oil film thickness h, the breakage rate α, and the like) of the lubricant at that time point based on the information acquired in S302 and S303 by using the electrical impedance method such as the method described in Japanese Patent No. 7099551.

In S305, the control device 100 determines whether the breakage of the oil film is detected based on the breakage rate α derived in S304. Here, a case in which the breakage of the oil film is detected may be, for example, a case in which the breakage rate α is larger than a predetermined threshold value. The threshold value for the breakage rate α is defined in advance and is stored in the storage unit or the like. When the breakage of the oil film is detected (YES in S305), the process performed by the control device 100 proceeds to S308. On the other hand, when the breakage of the oil film is not detected (NO in S305), the process performed by the control device 100 proceeds to S306.

In S306, the control device 100 determines whether an excessive lubrication state is achieved, that is, whether the first lubrication state is achieved based on the oil film thickness h derived in S304. The determination here may be performed based on whether a range of the oil film thickness corresponding to the second lubrication state is set in advance and whether the derived oil film thickness h falls within the range. As described above, when the oil film thickness h exceeds the set range, there is no problem in lubrication, but the torque M increases, which may hinder an efficient operation. When the excessive lubrication state is achieved (YES in S306), the process performed by the control device 100 returns to S302, and the process is repeated. At this time, the control device 100 may continue the process in S302 after a certain wait time (for example, one minute, five minutes, ten minutes, or the like) has elapsed. When the excessive lubrication state is not achieved (NO in S306), the process performed by the control device 100 proceeds to S307.

In S307, the control device 100 instructs the lubricant supply device 400 to supply the lubricant to the rolling device 300, and executes the lubricant supply control. In the supply control here, a constant supply amount defined in advance may be used as the supply amount, and a value varied according to a comparison result with the threshold value in S305 or S306 may be used. After the process ends, the process returns to S302, and the process is repeated. At this time, the control device 100 may continue the process in S302 after a certain wait time (for example, one minute, five minutes, ten minutes, or the like) has elapsed. In this step, when the constant supply amount is used, the wait time here may be adjusted. For example, when the oil film thickness h derived in S304 is close to the first lubrication state, the wait time may be increased. That is, a next measurement timing according to the electrical impedance method may be controlled based on a difference between the derived oil film thickness h and the theoretical oil film thickness $h_c$. Accordingly, the frequency of unnecessary measurement or derivation process can be restrained and a processing load can be reduced according to the oil film thickness at a certain time point.

In S308, the control device 100 controls to stop the rotational motion of the rolling device 300. When the breakage rate α of the oil film exceeds a certain threshold value regardless of the lubricant supply control being performed, the rotational motion may be stopped assuming that there is an abnormality.

In S309, the control device 100 issues, by using a predetermined method, a notification that the rotational motion of the rolling device 300 is stopped. Then, the processing flow ends.

In the processing flow of FIG. 3, the rotational motion of the rolling device 300 is controlled to be stopped based on the breakage rate α of the oil film, but the present invention is not limited thereto. Further, for example, when the lubricant supply device 400 cannot supply the lubricant (for example, depletion of the lubricant that can be supplied or damage to a supply portion), the rotational motion of the rolling device 300 may be controlled to be stopped.

In the above example, the lubricant supply control is performed by using the oil film thickness h and the breakage rate α of the oil film, but the present invention is not limited thereto. For example, the supply control may be performed by using the ratio of the theoretical oil film thickness $h_c$ to the oil film thickness h derived from a measured value. Also in this case, at least one of the supply amount and the supply timing (the supply frequency) of the lubricant may be controlled such that the ratio of the oil film thickness falls within a range of a threshold value defined in advance.

As described above, according to the present embodiment, it is possible to control the lubricant supply control with higher accuracy. As a result, it is possible to prevent burn-in due to the insufficient lubricant in the rolling device, damage to components, or the like.

OTHER EMBODIMENTS

In the present invention, a program or an application for implementing functions of the one or more embodiments described above may be supplied to a system or a device using a network or a storage medium, and a process in which one or more processors in a computer of the system or the device read and execute the program may be implemented.

In addition, the process may be implemented by a circuit (for example, an application specific integrated circuit (ASIC) or a field programmable gate array (FPGA)) that implements one or more functions.

As described above, the present invention is not limited to the above embodiments, and combinations of the respective configurations of the embodiments and changes and modifications made by those skilled in the art based on the descriptions in the description and the well-known technique are intended by the present invention and are thus also included within the scope of the present invention to be protected.

As described above, the following matters are disclosed in the present description.

(1) A lubricant supply control method for a device that lubricates a plurality of portions using a lubricant, includes:

a measurement step of measuring an impedance of an electric circuit including the plurality of portions by applying an AC voltage to the electric circuit;

a derivation step of deriving an oil film thickness and a breakage rate of an oil film between the plurality of portions based on the impedance measured in the measurement step; and a control step of controlling at least one of a supply amount and a supply timing of the lubricant to the device based on the oil film thickness and the breakage rate of the oil film derived in the derivation step so that a lubrication state between the plurality of portions becomes a predetermined lubrication state.

With this configuration, it is possible to provide a lubricant that is capable of achieving reduction in torque and restraining wasteful consumption of a lubricant in a device using the lubricant.

(2) In the supply control method according to (1), the predetermined lubrication state is a state in which the breakage rate of the oil film is 0 or substantially 0, and the oil film thickness is smaller than a theoretical oil film thickness between the plurality of portions.

With this configuration, it is possible to perform the lubricant supply control capable of achieving the reduction in torque while restraining the breakage of the oil film.

(3) In the supply control method according to (2), in the control step, a measurement timing in the next measurement step is controlled based on a difference between the oil film thickness derived in the derivation step and the theoretical oil film thickness.

With this configuration, it is possible to control the measurement timing based on the oil film thickness, and to restrain the processing load related to the measurement.

(4) In the supply control method according to any one of (1) to (3), the device is a rolling device.

With this configuration, it is possible to perform the lubricant supply control with respect to the rolling device.

(5) In the supply control method according to any one of (1) to (3), the device is a bearing device, and the plurality of portions include an outer member, an inner member, and a rolling element.

With this configuration, it is possible to perform the lubricant supply control around the rolling elements with respect to the bearing device.

(6) A lubricant supply control device for a device that lubricates a plurality of portions using a lubricant, includes:

a measurement unit configured to measure an impedance of an electric circuit including the plurality of portions by applying an AC voltage to the electric circuit;

a derivation unit configured to derive an oil film thickness and a breakage rate of an oil film between the plurality of portions based on the impedance measured by the measurement unit; and a control unit configured to control at least one of a supply amount and a supply timing of the lubricant to the device based on the oil film thickness and the breakage rate of the oil film derived by the derivation unit so that a lubrication state between the plurality of portions becomes a predetermined lubrication state.

With this configuration, it is possible to provide a lubricant that is capable of achieving reduction in torque and restraining wasteful consumption of a lubricant in a device using the lubricant.

(7) A program for causing a computer to execute:

a measurement step of measuring an impedance of an electric circuit including a plurality of portions, which are lubricated by using a lubricant in a device, by applying an AC voltage to the electric circuit;

a derivation step of deriving an oil film thickness and a breakage rate of an oil film between the plurality of portions based on the impedance measured in the measurement step; and a control step of controlling at least one of a supply amount and a supply timing of the lubricant to the device based on the oil film thickness and the breakage rate of the oil film derived in the derivation step so that a lubrication state between the plurality of portions becomes a predetermined lubrication state.

With this configuration, it is possible to provide a lubricant that is capable of achieving reduction in torque and restraining wasteful consumption of a lubricant in a device using the lubricant.

Although various embodiments have been described above, it is needless to mention that the present invention is not limited to such embodiments. It is apparent for those skilled in the art to which the present disclosure belongs that various modified examples or corrected examples are conceivable within the scope recited in the claims, and it is understood that the above falls within the technical scope of the present invention. In addition, the components described in the above embodiments may be combined in any manner without departing from the spirit of the invention.

REFERENCE SIGNS LIST

1 system
100 control device
101 state detection device control unit
102 rolling device control unit
103 supply device control unit
104 state monitoring unit
105 state notifying unit
106 historical information managing unit
200 state detection device
300 rolling device
400 lubricant supply device

The invention claimed is:

1. A lubricant supply control method for a device that lubricates a plurality of portions using a lubricant, the lubricant supply control method comprising:

measuring an impedance of an electric circuit including the plurality of portions by applying an AC voltage to the electric circuit;

deriving an oil film thickness and a breakage rate of an oil film between the plurality of portions based on the impedance measured in the measurement; and controlling at least one of a supply amount and a supply timing of the lubricant to the device based on the oil film thickness and the breakage rate of the oil film derived in the derivation so that a lubrication state between the plurality of portions becomes a predetermined lubrication state, wherein the predetermined lubrication state is a state in which the breakage rate of the oil film is 0 or substantially 0, and the oil film thickness is smaller than a theoretical oil film thickness between the plurality of portions, and wherein in the controlling of at least one of the supply amount and the supply timing of the lubricant to the device, a measurement timing in the next measurement of the impedance is controlled based on a difference between the oil film thickness derived in the derivation and the theoretical oil film thickness.

2. A lubricant supply control device for a device that lubricates a plurality of portions using a lubricant, the lubricant supply control device comprising:

a measurement unit configured to measure an impedance of an electric circuit including the plurality of portions by applying an AC voltage to the electric circuit;

a derivation unit configured to derive an oil film thickness and a breakage rate of an oil film between the plurality of portions based on the impedance measured by the measurement unit; and a control unit configured to control at least one of a supply amount and a supply timing of the lubricant to the device based on the oil film thickness and the breakage rate of the oil film derived by the derivation unit so that a lubrication state between the plurality of portions becomes a predetermined lubrication state, wherein the predetermined lubrication state is a state in which the breakage rate of the oil film is 0 or substantially 0, and the oil film thickness is smaller than a theoretical oil film thickness between the plurality of portions, and wherein in the controlling of at least one of the supply amount and the supply timing of the lubricant to the device, a measurement timing in the next measurement of the impedance is controlled based on a difference between the oil film thickness derived in the derivation and the theoretical oil film thickness.

3. A computer program product comprising a non-transitory computer readable storage medium having instructions encoded thereon that, when executed by a processor, cause the processor to execute a procedure comprising:

measuring an impedance of an electric circuit including a plurality of portions, which are lubricated by using a lubricant in a device, by applying an AC voltage to the electric circuit;

deriving an oil film thickness and a breakage rate of an oil film between the plurality of portions based on the impedance measured in the measurement; and controlling at least one of a supply amount and a supply timing of the lubricant to the device based on the oil film thickness and the breakage rate of the oil film derived in the derivation so that a lubrication state between the plurality of portions becomes a predetermined lubrication state, wherein the predetermined lubrication state is a state in which the breakage rate of the oil film is 0 or substantially 0, and the oil film thickness is smaller than a theoretical oil film thickness between the plurality of portions, and wherein in the controlling of at least one of the supply amount and the supply timing of the lubricant to the device, a measurement timing in the next measurement of the impedance is controlled based on a difference between the oil film thickness derived in the derivation and the theoretical oil film thickness.

* * * * *